United States Patent
Reese et al.

(10) Patent No.: US 11,319,256 B2
(45) Date of Patent: May 3, 2022

(54) FIBER-REINFORCED METAL-, CERAMIC-, AND METAL/CERAMIC-MATRIX COMPOSITE MATERIALS AND METHODS THEREFOR

(71) Applicant: Arris Composites Inc., Berkeley, CA (US)

(72) Inventors: Riley Reese, Carpinteria, CA (US); Ethan Escowitz, Berkeley, CA (US)

(73) Assignee: Arris Composites Inc., Berkeley, CA (US)

( * ) Notice: Subject to any disclaimer, the term of this patent is extended or adjusted under 35 U.S.C. 154(b) by 402 days.

(21) Appl. No.: 16/135,931

(22) Filed: Sep. 19, 2018

(65) Prior Publication Data
US 2019/0168420 A1    Jun. 6, 2019

Related U.S. Application Data

(60) Provisional application No. 62/560,306, filed on Sep. 19, 2017.

(51) Int. Cl.
*C04B 35/80* (2006.01)
*C22C 47/14* (2006.01)
(Continued)

(52) U.S. Cl.
CPC ............ *C04B 35/80* (2013.01); *B29B 15/122* (2013.01); *B29B 15/125* (2013.01);
(Continued)

(58) Field of Classification Search
CPC ..... B29C 48/15; B29C 48/156; B29C 48/022; B29C 48/05; B29C 48/0011;
(Continued)

(56) References Cited

U.S. PATENT DOCUMENTS 3,990,860 A * 11/1976 Fletcher .................... B22F 1/02
428/404
4,614,678 A * 9/1986 Ganga ................... B29C 70/086
428/74

(Continued)

FOREIGN PATENT DOCUMENTS

EP    0274464 B1    7/1988
EP    0400788 A1    12/1990

OTHER PUBLICATIONS

Invitation to Pay Additional Fees and Where Applicable Protest Fee and Partial International Search issued in PCT Patent Application No. PCT/US2018/051794 dated Feb. 25, 2019.
(Continued)

*Primary Examiner* — Jeffrey M Wollschlager
(74) *Attorney, Agent, or Firm* — Kaplan Breyer Schwarz, LLP (57) ABSTRACT

A method is disclosed for forming extrudate filament, which consist essentially of fiber, organic binder, and metal and/or ceramic. The extrudate filament can be spooled, or used to form preforms, and/or assemblages of preforms. In further methods, the extrudate filament and/or preforms can be used to fabricate fiber-reinforced metal-matrix or ceramic-matrix or metal and ceramic matrix composite parts, which consist essentially of fiber in a matrix of metal, or ceramic, or metal and ceramic, respectively.

23 Claims, 6 Drawing Sheets

(51) Int. Cl.
| | |
|---|---|
| *C04B 35/82* | (2006.01) |
| *C22C 49/00* | (2006.01) |
| *C22C 47/06* | (2006.01) |
| *C22C 49/14* | (2006.01) |
| *C04B 35/634* | (2006.01) |
| *C22C 49/08* | (2006.01) |
| *C04B 35/626* | (2006.01) |
| *C04B 35/628* | (2006.01) |
| *C04B 35/488* | (2006.01) |
| *C04B 35/638* | (2006.01) |
| *B29B 15/12* | (2006.01) |
| *B29C 48/00* | (2019.01) |
| *B29C 48/05* | (2019.01) |
| *B29B 15/14* | (2006.01) |
| *B29K 105/10* | (2006.01) |
| *B29K 105/00* | (2006.01) |
| *B29K 307/04* | (2006.01) |
| *B29K 505/00* | (2006.01) |
| *B29K 509/02* | (2006.01) |

(52) U.S. Cl.
CPC ............ *B29B 15/127* (2013.01); *B29B 15/14* (2013.01); *B29C 48/0011* (2019.02); *B29C 48/022* (2019.02); *B29C 48/05* (2019.02); *C04B 35/488* (2013.01); *C04B 35/62695* (2013.01); *C04B 35/62855* (2013.01); *C04B 35/62892* (2013.01); *C04B 35/638* (2013.01); *C04B 35/63464* (2013.01); *C04B 35/82* (2013.01); *C22C 47/06* (2013.01); *C22C 47/14* (2013.01); *C22C 49/00* (2013.01); *C22C 49/08* (2013.01); *C22C 49/14* (2013.01); *B29K 2105/10* (2013.01); *B29K 2105/253* (2013.01); *B29K 2307/04* (2013.01); *B29K 2505/00* (2013.01); *B29K 2509/02* (2013.01); *C04B 2235/5248* (2013.01); *C04B 2235/5436* (2013.01); *C04B 2235/6021* (2013.01); *C04B 2235/6562* (2013.01); *C04B 2235/6565* (2013.01)

(58) Field of Classification Search
CPC ... B29C 70/021; B29C 70/023; B29C 70/025; D01D 11/02; D02J 1/18; B29B 15/14; B29B 15/127; B29B 15/125; B29B 15/122; B29B 11/16; B29B 15/10; B29B 15/105; B29B 15/12; C04B 35/803; C04B 35/82; C04B 35/63464; C04B 35/62695; C04B 35/62892; C04B 35/62855; C04B 35/488; C04B 35/638; C04B 2235/6021; C04B 2235/5436; C04B 2235/6562; C04B 2235/5248; C04B 2235/6565; C04B 35/80; B29K 2105/10; B29K 2105/253; B29K 2307/04; B29K 2505/00; B29K 2509/02; C22C 47/06; C22C 47/062; C22C 47/14; C22C 49/00; C22C 49/14; C22C 49/08

See application file for complete search history.

(56) References Cited

U.S. PATENT DOCUMENTS

| | | | | |
|---|---|---|---|---|
| 4,713,283 | A * | 12/1987 | Cogswell | B29C 70/025 427/389.9 |
| 5,024,978 | A * | 6/1991 | Allaire | C03C 14/002 264/640 |
| 5,154,787 | A * | 10/1992 | Gardner | C04B 35/634 156/166 |
| 5,225,015 | A * | 7/1993 | Allaire | C03B 11/14 156/155 |
| 5,250,243 | A * | 10/1993 | Allaire | B32B 18/00 264/640 |
| 5,354,521 | A * | 10/1994 | Goodman | F16L 11/12 264/429 |
| 5,439,627 | A | 8/1995 | De Jager | |
| 5,549,770 | A * | 8/1996 | Larker | C04B 35/6455 156/89.27 |
| 5,891,249 | A | 4/1999 | Bieler et al. | |
| 6,049,956 | A * | 4/2000 | Lifke | B65H 51/005 19/65 T |
| 6,074,716 | A * | 6/2000 | Tsotsis | D02G 3/40 428/293.1 |
| 6,355,338 | B1 * | 3/2002 | Hilmas | C04B 35/62868 428/297.1 |
| 6,899,777 | B2 * | 5/2005 | Vaidyanathan | B33Y 10/00 156/89.11 |
| 2002/0058576 | A1 * | 5/2002 | Mazany | C03C 1/006 501/32 |
| 2003/0220424 | A1 | 11/2003 | Schofalvi et al. | |
| 2007/0001339 | A1 * | 1/2007 | Garcia | B29B 7/826 264/142 |
| 2013/0075953 | A1 * | 3/2013 | Casari | B29C 45/0001 264/328.14 |
| 2013/0134621 | A1 * | 5/2013 | Tsotsis | B29C 48/90 264/177.2 |
| 2014/0158684 | A1 * | 6/2014 | Gross | B65D 17/502 220/254.1 |
| 2014/0272417 | A1 * | 9/2014 | Zeidan | B29B 7/603 428/407 |
| 2015/0011691 | A1 * | 1/2015 | Sekimura | C08J 5/10 524/494 |
| 2016/0230314 | A1 * | 8/2016 | Capwell | D01F 1/07 |
| 2017/0260346 | A1 * | 9/2017 | Hirata | C08J 5/042 |
| 2018/0029249 | A1 * | 2/2018 | Desbois | B29C 43/02 |

OTHER PUBLICATIONS

Authorized Officer: Giel-Barragan Ramos, Cecilia, ISR/WO dated Apr. 18, 2019, issued in PCT/US2018/051794, dated Apr. 18, 2019.
Kamyar Shirvanimoghaddam et al., "Carbon fiber reinforced metal matrix composites: Fabrication processes and properties", "Composites: Part A", Publisher: Elsevier, Nov. 1, 2016, 70-96, 92.

* cited by examiner

FIBER-REINFORCED METAL-, CERAMIC-, AND METAL/CERAMIC-MATRIX COMPOSITE MATERIALS AND METHODS THEREFOR

STATEMENT OF RELATED CASES

This disclosure claims priority to U.S. Pat. App. Ser. 62/560,306 filed Sep. 19, 2017 and which is incorporated herein by reference.

FIELD OF THE INVENTION

This disclosure relates generally to fiber-reinforced metal- and ceramic-matrix composite materials.

BACKGROUND

A fiber composite includes fibers that are dispersed within a matrix. The matrix surrounds and supports the fibers by maintaining their relative positions, in addition to preventing the fibers from abrasion and environmental attack. The fibers impart their mechanical and physical properties to enhance those of the matrix. The combination is synergistic; the composite possesses material properties unavailable from the individual constituents, such as an exceptionally high strength-to-weight ratio.

Fiber composites derive this synergism from strong interfacial adhesion between the matrix and the fiber, which is necessary to effectively transfer loads to the embedded fibers. Strong interfacial adhesion requires that the fibers are adequately wet by the matrix. Matrix materials having relatively high flowability and relatively low surface tension promote wetting. Because polymers possess these properties, in addition to other desirable attributes, they are typically used as the matrix.

Although polymer-based composites provide high strength, even carbon-fiber reinforced polymer composites are not always able to match the strength, hardness, and durability of metals. Furthermore, fiber-reinforced polymer composites can degrade at high temperatures and often have limited ductility. But metals tend to be heavier than fiber composites, so metal is often not an option for weight-sensitive applications. In such situations, it would be desirable to use a fiber-reinforced metal-matrix composite.

Such composites have been known since the 1970s, but due to problematic manufacturing techniques, their use has been limited to a few specialized applications. Methods for producing fiber-reinforced metal-matrix composites fall generally into three groups: solid-state processing, liquid-state processing, and deposition processing. In solid-state processing, composites result from the bonding between a metallic matrix and fiber as a consequence of mutual diffusion at high temperature and pressure. Examples of solid-state processing include powder metallurgy and diffusion bonding. In liquid-state processing, liquid metal is applied to fiber. Examples of liquid-state processing include melt stirring, slurry casting, squeeze casting, and liquid-infiltration processing (both pressure and pressureless infiltration). Deposition processing includes techniques such as ion plating and plasma spraying.

Most of these methods suffer from poor dispersion and/or wetting of the fibers. This can result in voids and air gaps between the surface of the metal and the fiber. These voids lead to crack propagation when the part formed from the fiber-reinforced metal-matrix composite is under stress, resulting in premature failure of the part.

SUMMARY

The present invention provides ways to make fiber-reinforced metal and ceramic matrix composite materials that avoid some of the costs and disadvantages of the prior art.

Some methods in accordance with the illustrative embodiment produce fibers laden with binder and metal and/or ceramic, which, in accordance with further methods disclosed herein, can be used to create parts that are composed solely of fibers in a metal and/or ceramic matrix.

In accordance with the illustrative embodiment, a binder (typically a thermoplastic polymer), a metal powder and/or a ceramic powder, and optional additives are applied to a plurality of continuous fibers. In some embodiments, the fiber feedstock is one or more carbon-fiber tows. Carbon-fiber tows typically include 12,000 (12K) or 24,000 (24K) fibers, although bundles of 1K, 3K, 6K, and 50K fibers are also available.

To facilitate the application of the binder, powder, and optional additives to the fibers and promote a uniform coating, the fibers are spread apart and placed under tension prior to application. The result of this processing is a plurality of fibers laden with polymeric binder and metal and/or ceramic. For brevity, reference to the terms "metal" or "ceramic" in this disclosure are hereinafter understood to mean "metal and/or ceramic."

These material-laden fibers are referred to herein as "extrudate filament." Since embodiments of the invention involve processing thousands of fibers, as indicated above, the term "extrudate filament" does not refer to a "single" material-laden fiber; rather, it refers to many thousands of them. As processed, such as by passage through a die, extrudate filament will have a defined cross section; typically, circular, oval, or rectangular. In some embodiments, a process in accordance with the invention produces cut (sized) or shaped (e.g., bent, etc.) extrudate filament, which is referred to herein as a "preform."

In further embodiments, the one or more bundles of extrudate filament or preform are further processed, such as via compression molding or other techniques, to form finished parts. An aspect of this further processing includes a "debinding" step to remove the binder and other organics, and a "sintering" step to fuse the metal particles on the extrudate filament(s)/preform(s) into a solid mass. The result is a part that consists of fiber in a matrix of metal, ceramic, or metal and ceramic.

In some embodiments, the extrudate filament is produced via a pultrusion process for use with thermoplastics (as opposed to thermosets), as modified for use with embodiments of the invention. Thermoplastic pultrusion processes are well known to those skilled in the art.

As practiced in conjunction with the illustrative embodiment of the present invention, a plurality of fibers, in the form of one or more tows or more bundles, are placed in tension by a pulling mechanism (e.g., roller, plates, etc.) located near the downstream end of the pultrusion processing line. The metal, binder, and optional additives are then applied to the spread and tensioned fibers via one of several approaches.

For example, in some embodiments, metal powder is first sprayed onto the fibers, and then binder is introduced via injection molding. In some other embodiments, the binder and metal powder are compounded together, pelletized, and then applied to the fiber via the injection molding. In yet some further embodiments, binder and metal powder are mixed together, such as via melt blending, and applied to the fibers in an impregnation device. In this latter embodiment, these materials may be applied to the fibers via pultrusion, spraying onto the fibers, or dip coating. In all such embodiments, optional additives and fillers may be added to promote wetting and interfacial bonding between the resin (binder)/powder combination and the fiber.

Extrudate filament, once produced, may be further handled or processed in a number of ways, such as spooling it for later use or sale, or producing preforms (e.g., bending and/or sizing it) for use in conjunction with the manufacture of a particular part.

For example, in some embodiments, extrudate filament or preforms (or assemblages of preforms, referred to as "preform charges") are placed in a mold cavity, etc., to form a layup. The layup is then heated and compressed, in accordance with the particular molding technique be used (e.g., compression molding, etc.). The result is a "green body." The binder and other organics originally present on the extrudate filament, etc., are present in the green body. They are removed in a "debinding" step, which involves exposure to relatively higher temperatures than were required to form the green body. Alternatively, debinding can be effected chemically.

Debinding of the green body results in a "brown body." The brown body is exposed to high temperatures to fuse the metal particles into a solid mass, so called "sintering," thereby taking the part to its end stage, resulting in a fiber-reinforced metal-matrix composite part. In some embodiments, the green body is converted directly to a fiber-reinforced metal-matrix composite part via two-stage heating: first at a moderate temperature to debind, and then at a high temperature to sinter.

The formation of a preform charge, a green body, a brown body, and finished parts is typically performed batchwise, and via a processing that is separate from the pultrusion line.

In accordance with some embodiments, extrudate filament, preforms, and preform charges can be used to form layups for various molding processes, such as compression molding, injection molding, tape layup, winding, laminating, or a combination of any of the foregoing.

More particularly, in various embodiments, the present invention provides:
  (i) fibers laden with metal powder and resin, and optional flow agents/additives, and having a shaped cross-section ("extrudate filament");
  (ii) cut and/or shaped extrudate filament ("preform");
  (iii) an assembly of plural preforms ("preform charge");
  (iv) parts made from (i), and/or (ii), and/or (iii), with treated (thermally or chemically) resin remaining ("green body");
  (v) parts made from (iv) with resin removed ("brown body");
  (vi) fiber-reinforced metal-matrix composite parts made from (i) through (v); and
  (vii) methods for making (i) through (vi).

Items (i)-(v) are not necessarily "intermediates" in the sense that a producer of, for example, extrudate filament, preforms, preform charges, etc., could simply sell such materials. A subsequent buyer would typically use such materials to make fiber-reinforced metal-matrix composite parts.

The extrudate filament and preforms formed in accordance with the present teachings can be used to fabricate complex fiber-reinforced metal-matrix composite parts having high mechanical strength, and can be used to replace metal parts in, for example, aerospace applications, consumer electronics, sporting equipment, vehicles, surgical implants, communications devices, portable devices, medical devices, robotics, industrial equipment and prosthetics.

DETAILED DESCRIPTION

The following terms, and their inflected forms, are defined for use in this disclosure and the appended claims as follows:

"Fiber" means an individual strand of material. A fiber has a length that is much greater than its diameter. In the context of composites, fibers are classified as (i) short/chopped/discontinuous or (ii) continuous. Short fibers have a length that is much shorter than the part in which they are used; continuous fibers have a length that is comparable to the size of the part in which they are used. Short fibers typically have a random orientation in the matrix or final part; continuous fibers usually have a defined and unidirectional orientation in the matrix or part. As used herein, the term "fiber" means continuous fiber, unless modified by the term "chopped" or "cut".

"Extrudate Filament" means raw fiber plus binder and metal, or binder and ceramic, or binder and metal and ceramic, and optionally, flow additives and fillers. The term, although "singular," refers to many (typically thousands) of such material-laden fibers, since embodiments of the invention do not and cannot address a single fiber. Extrudate filament has a defined cross section, typically circular, oval, or rectangular, as defined by passing the material-laden fiber through a die. It is notable that this is not the conventional usage of the term "filament," which is generally considered to be synonymous with "continuous fiber".

"Powder" means a bulk collection of particles having a mean particle diameter of less than about 100 microns, and preferable about 10 microns. The particle within a powder can be spherical or have a different form, including irregular forms.

"Preform" means altered (e.g., bent, sized, etc.) extrudate filament.

"Prepreg" means fiber, fabric, etc., that is coated with heat-activated or chemically activated resin.

"Roving" or "Tow" means an untwisted and unidirectional bundle of continuous fiber. The term "bundle" is used herein synonymously with the terms roving and tow. Tows usually contain multiples of 1000 fibers, such as a 1K tow (1000 fibers), a 12K tow (12,000 fibers), a 24K tow (24,000 fibers), etc.

"Sizing" means a coating that is added to fibers, typically carbon fiber, to improve handling, processing, and compatibility between fiber and resin.

"Stiffness" means resistance to bending, as measured by Young's modulus.

"Tensile strength" means the maximum stress that a material can withstand while it is being stretched/pulled before "necking" or otherwise failing (in the case of brittle materials).

"Yarn" means a twisted bundle of fiber, not necessarily continuous fiber.

Other than in the examples, or where otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−15%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

Figure 1:
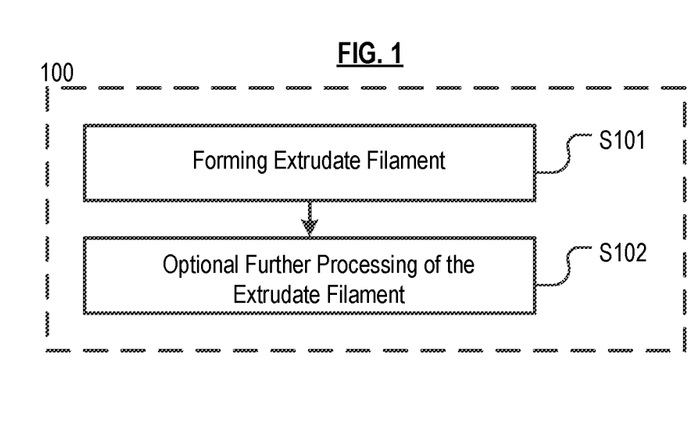
FIG. 1 depicts method 100 in accordance with the illustrative embodiment of the present invention.

FIG. 1 depicts method 100 in accordance with the illustrative embodiment of the present invention. In accordance with operation S101 of method 100, extrudate filament is formed. Briefly, operation S101 involves applying binder, metal and/or ceramic particles, and optional additives to a fiber feed consisting of thousands of continuous fibers. This operation is described in further detail in conjunction with FIGS. 2 and 6 through 10. In optional operation S102, extrudate filament is further processed. This optional operation is described in further detail in conjunction with FIGS. 3 through 5.

In the illustrative embodiment, a pultrusion processing line, configured for use with thermoplastics, and further modified as appropriate for use herein, is used to produce extrudate filament. Only those portions of the pultrusion process that are germane to the operations being discussed will be depicted in the Figures.

Extrudate Filament.

Figure 2:
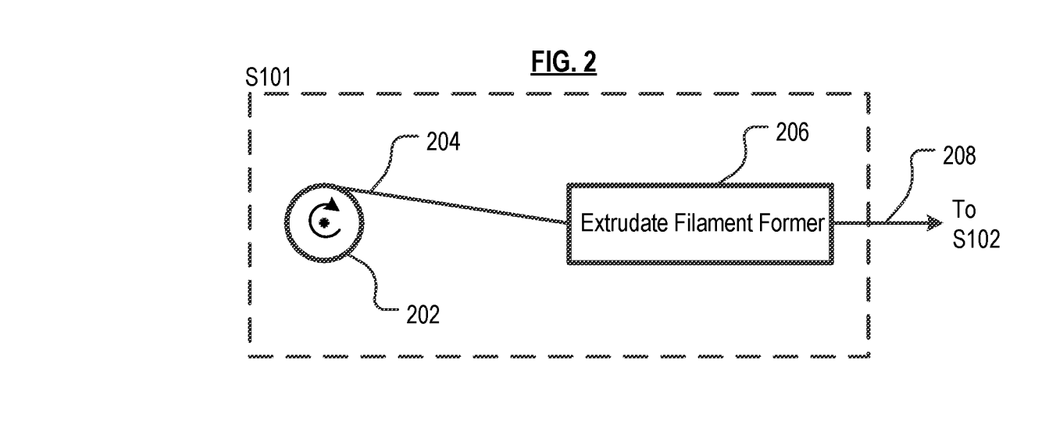
FIG. 2 depicts a schematic of the first operation of method 100.

FIG. 2 depicts a schematic for accomplishing operation S101 of method 100. FIG. 2 depicts spool 202 of fiber tow 204, which is the fiber feed for embodiments of the invention. A fiber tow includes thousands of individual fibers. Although one spool is depicted in FIG. 2, a processing line for producing extrudate filament in accordance with the invention may include multiple spools 202 of fiber tows. The continuous fibers of the tow(s) 204 are placed under tension, by a pulling mechanism, not shown in this Figure. If multiple spools 202 are used, a fiber alignment device is typically employed to direct the fiber tows toward downstream equipment and prevent twisting thereof.

The fibers are then processed by one or more pieces of equipment that are generically referred to as extrudate filament former 206. This assemblage of equipment applies binder, metal and/or ceramic particles, and optional additives to the fibers thereby producing extrudate filament 208. Extrudate filament former 206 may be embodied in a variety of different ways, including the arrangements depicted in FIGS. 8-10, as discussed later in this specification. The extrudate filament former includes a die though which the material-laden fibers pass, which dictate the cross section of extrudate filament 208. For example, the cross section can be circular, oval, rectangular, square, or complex.

Processing the Extrudate Filament.

Figure 3:
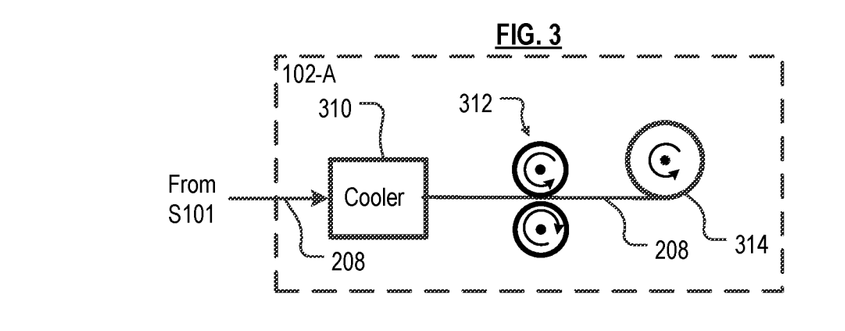
FIG. 3 depicts a first embodiment of the second operation of method 100.
Figure 4:
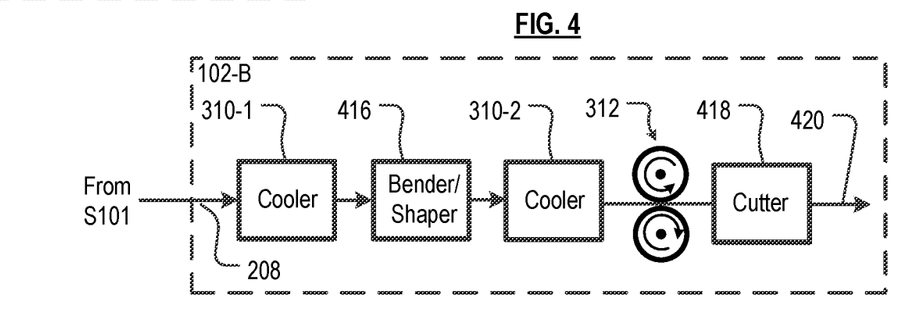
FIG. 4 depicts a second embodiment of the second operation of method 100.
Figure 5:
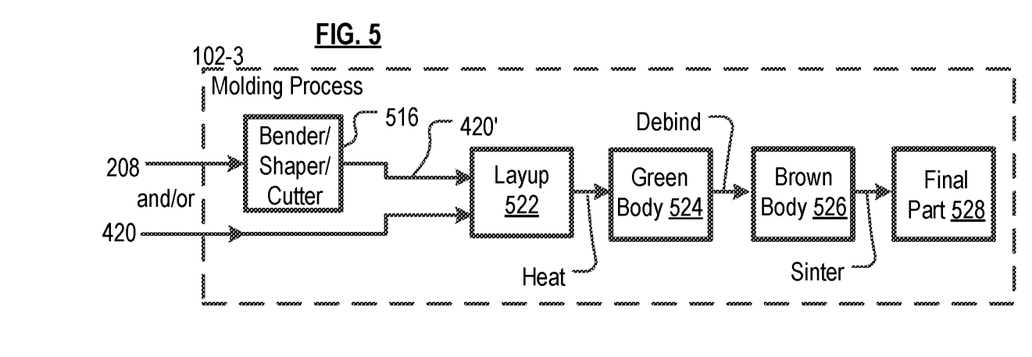
FIG. 5 depicts a third embodiment of the second operation of method 100.

The extrudate filament is then further processed in accordance with operation S102 of FIG. 1. FIGS. 3 through 5 depict embodiments of such further processing.

FIG. 3 depicts a first embodiment of optional operation S102, wherein extrudate filament 208 is spooled for sale or later use. In accordance with processing arrangement 102-A, extrudate filament 208 is cooled via cooler 310, which is typically forced air, such as provided by a fan. Although shown as a single cooler, cooling may be effected in multiple stages. The extrudate filament is cooled from the binder's melt temperature to about room temperature.

Pulling mechanism 312 is the device that keeps the fiber and, subsequently, extrudate filament under tension and moves it through the processing line. In the illustrative embodiment, pulling mechanism 312 is embodied as rotating wheels. However, in other embodiments, the pulling mechanism can be pneumatic clamps or other mechanisms, as are conventionally used in pultrusion processing. Extrudate filament is then spooled on spool 314.

FIG. 4 depicts a second embodiment of optional operation S102, wherein extrudate filament 208 is bent or otherwise shaped into a preform. In accordance with processing arrangement 102-B, extrudate filament 208 is cooled via cooler 310-1, which is typically forced air, such as provided by a fan. Since subsequent operations involve shape alteration of extrudate filament 208, it is not cooled to room temperature as in the embodiment of FIG. 3. In particular, although it is desirable for extrudate filament (that forms the preform) to be substantially non-malleable at room temperature (23° C.), it must become malleable (exceed the glass transition temperature) at elevated temperature to facilitate forming it into a desired shape. The temperature at which the preform becomes malleable is advantageously less than the debinding temperature and less than the sintering temperature. The extrudate filament 208 is thus cooled, in cooler 310-1, to a temperature above the glass transition temperature (but below the melt temperature) of the binder.

Extrudate filament is then bent or otherwise shaped in bender/shaper 416. In some embodiments, the bender/shaper is a wire bender, as is known in the art. The shaped material is passed through cooler 310-2, which cools it to room temperature. The material is then pulled through pulling mechanism 312 and then sized by cutter 418, producing preform 420.

The preform can have any suitable dimension including width, length, and thickness as appropriate for forming a particular fiber-reinforced metal-matrix composite part. As a function of shape of the extrudate filament, the preform can have a cross-sectional shape that is substantially round, oval, rectangular, or complex. In some embodiments, the preform includes features that facilitate layup and alignment with other preforms in a mold cavity, as used to form the final part. Such features include, for example and without limitation, grooves or ridges. These features can be formed via the die that is part of extrudate filament former 206.

FIG. 5 depicts a third embodiment of optional operation S102, wherein extrudate filament 208 or preform 420 (or preform charge) is used to form a fiber-reinforced metal-matrix composite part. In accordance with processing arrangement 102-3, if extrudate filament 208 is being used as a "starting" material for the molding process, it must first be converted to preform 420' before being placed in a mold cavity to form layup 522. That is, the one or more bundles of extrudate filament 208 must first be sized, or bent/shaped and sized. These operations are performed by bender/shaper/cutter 516 (it being understood that these operations would typically be performed by two separate devices, as in FIG. 4). Alternatively, one or more preforms 420 (or preform charges) are placed in a mold cavity to form layup 522.

It is to be understood that preform(s) 420', as formed from one or more extrudate filament(s) 208, may be different in size and/or shape than one or more of preform(s) 420. Moreover, it will be appreciated that to the extent that plural preforms 420' are to be placed in a mold, each or some of such preforms 420' may differ from other preforms 420'. Likewise, to the extent that plural preforms 420 (or preform charges) are used for the mold, each or some of such preforms 420 (or preform charges) may differ from other preforms 420 (or preform charges). Such preform-to-preform differences can be due to the shape/geometry of the particular mold cavity, or other considerations, such as the manner in which the final part will be used. With respect to the latter consideration, the arrangement/size/shape of the preforms used for any given mold may differ as a function of the particular use of the final part, such as is likely to affect the direction and/or magnitude of various stresses/strains/forces that the part will experience when in use. That is to say, a part, as produced from a mold cavity, might have a first layup defined by a first group and arrangement of preforms 420 and/or 420' when intended for a first use. But the same part fabricated from the same mold cavity and intended for a different use might require a second layup defined by a second group and arrangement of preforms 420 and/or 420'.

The layup is compressed under temperature and pressure to form green body 524. The organic materials in the "green" part are then chemically or thermally removed (debinding), thereby producing brown body 526. The brown body is then exposed to high temperature to sinter the metal particles to form a fiber-reinforced metal-matrix composite part.

In some embodiments, sintering is performed in a heating device, such as an oven. Sintering temperature is typically in the range of 1200 to 2000 C for metal and ceramics.

The processing from layup 522 to green body 524, to brown body 526, to final fiber-reinforced metal-matrix composite part 528 may take place in the same mold, but under different conditions of temperature. Thus, for compression molding, the process of fabricating a fiber-reinforced metal-matrix composite part includes: (1) assembling the mold layup; (2) molding; (3) debinding; and (4) sintering.

Extrudate filament 208 (once converted to preform 420') and/or preform 420 (and/or preform charge) can be placed into the mold manually or using automation. Automated methods include adaptations of automated tape layup/placement and automated fiber layup/placement. The methods described in U.S. application Ser. No. 15/612,720, filed on Jun. 2, 2017, may also be used. In these methods, preforms can be set into a mold cavity and compression molded. In addition to the metal or ceramic bearing fiber itself, metal or ceramic, in the form of powder, and/or fiber, and/or chopped fiber, can also be placed into the mold cavity.

Forming the Extrudate Filament.

Figure 6:
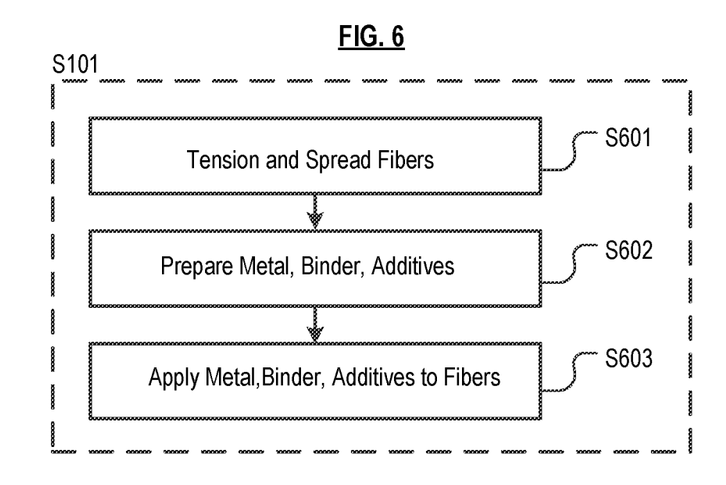
FIG. 6 depicts a method for performing the first operation of method 100.

FIG. 6 depicts a method for performing operation S101 of FIG. 1. That is, FIG. 6 depicts a method for forming extrudate filament 208.

In accordance with operation S601, the thousands of feed fibers are tensioned and spread apart. This process is illustrated notionally in FIG. 7. Within extrudate filament former 206, the many individuals fibers 730 in fiber tow(s) 204 are separated from one another, or into small groups of fibers, by fiber spreaders 732. The fibers are spread apart to ensure that, to the extent possible, the full surface area of each fiber 730 is accessible to metal and binder, thereby promoting uniform coating of the fibers.

Per operation S602, the metal, binder, and any additives are prepared. One or more of the metal, binder, and additives may be combined with one another in this operation. And in operation S603, the aforementioned materials are applied to the fibers.

Figure 8:
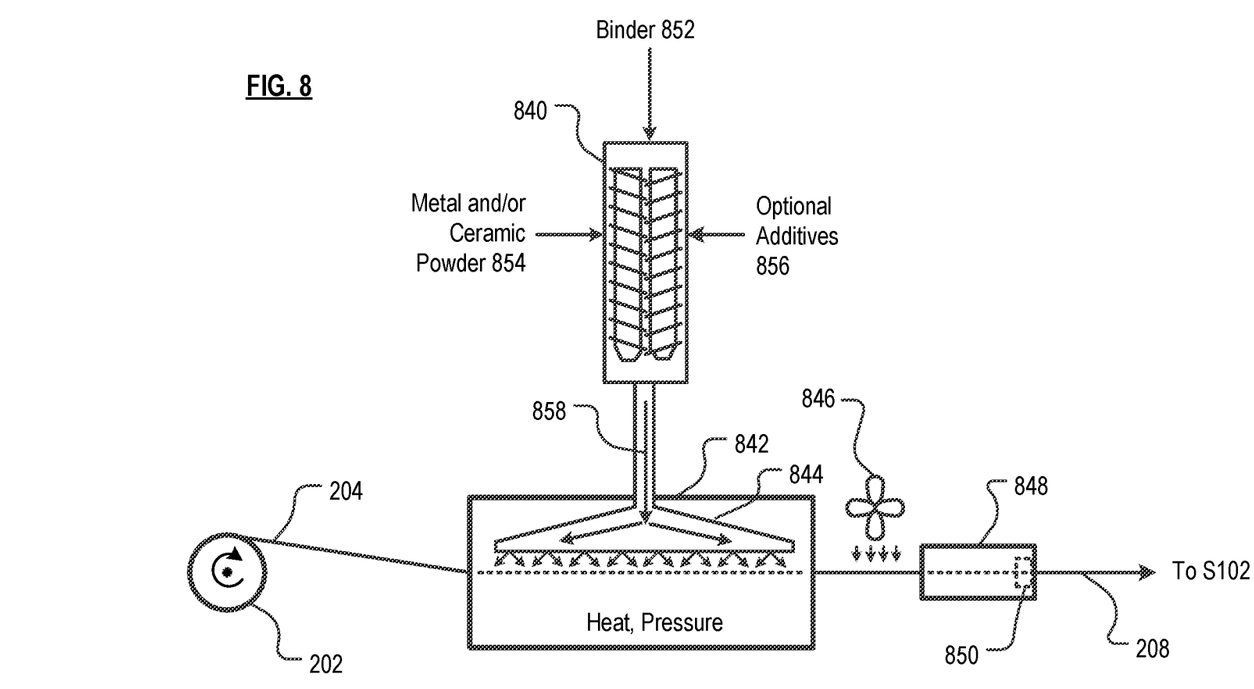
FIG. 8 depicts a schematic of a first embodiment for performing the second and third operations of the method of FIG. 6.
Figure 9:
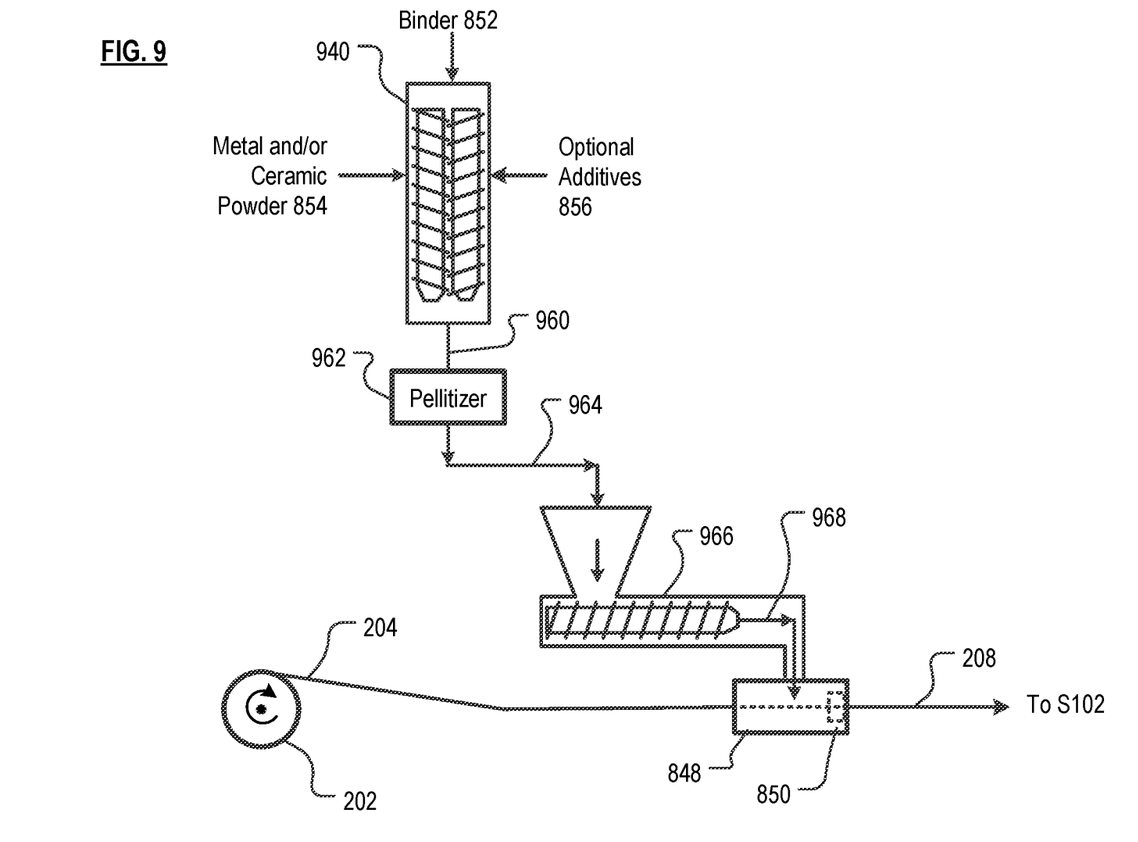
FIG. 9 depicts a schematic of a second embodiment for performing the second and third operations of the method of FIG. 6.
Figure 10:
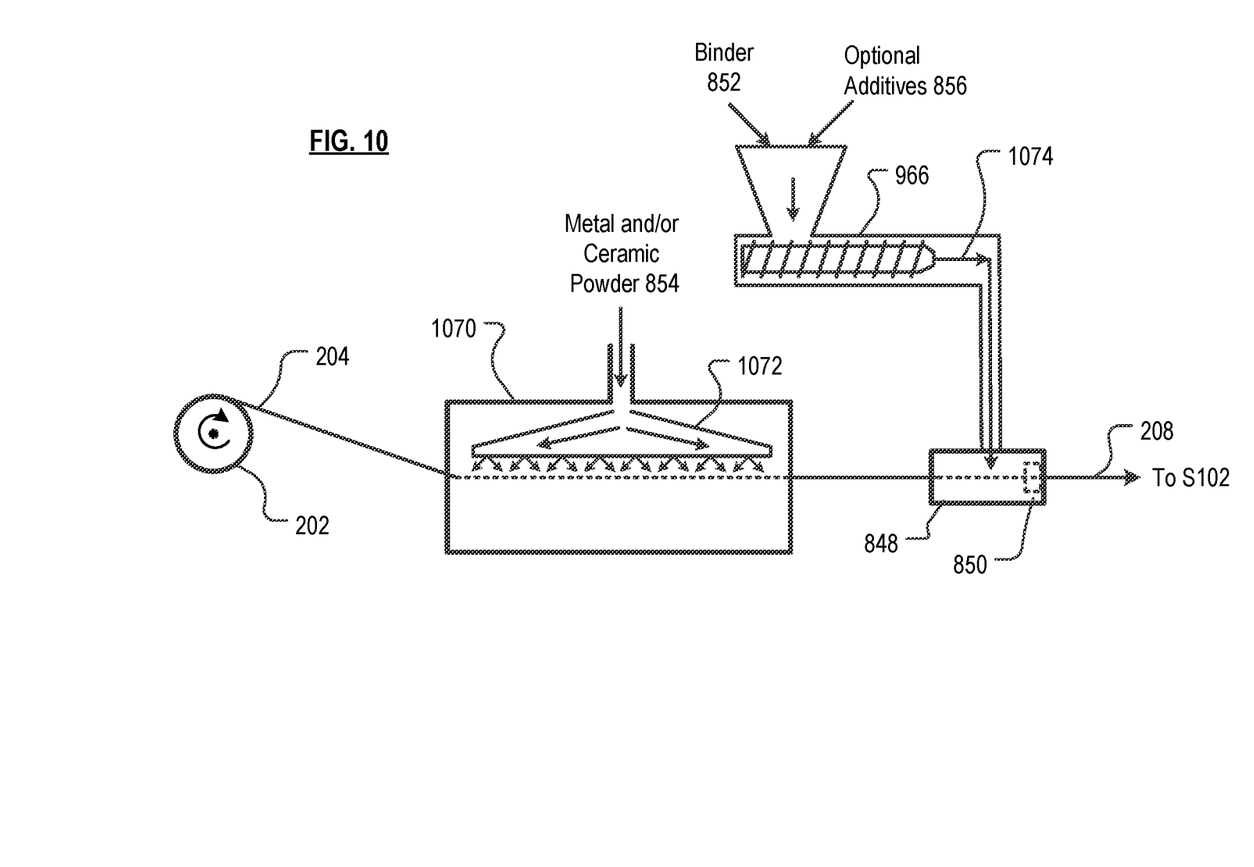
FIG. 10 depicts a schematic of a third embodiment for performing the second and third operations of the method of FIG. 6.

FIGS. 8 through 10 depict several embodiments for preparing and applying metal, binder, and additives to fiber. Although these figures do not depict the fibers spread apart from one another, it is to be understood that at the point of application of metal powder, binder, etc., the fibers are indeed spread. It will be appreciated that the fiber feed can include a single type of fiber, or, when multiple spools of fiber are used, several different types of fiber. Therefore, extrudate filament and preforms formed in accordance with the invention can include one or more different types of fiber (e.g., different grades of carbon, glass, or Kevlar, or combination thereof, etc.).

FIG. 8 depicts an embodiment in which binder, metal powder, and optional additives are mixed together, such as via melt blending, and applied to the fibers in an impregnation device. In this embodiment, binder 852 is fed to melt blender 840. Metal powder 854 and any optional additives 856 are added by side feeder(s). The result of this operation is mixture 858, which is flowable. To that end, the optional additives include, among any others, a viscosity modifier to ensure that at the prevailing temperatures, mixture 858 will readily flow.

Mixture 858 is fed to impregnation device 842, which, in the illustrative embodiment, the mixture is sprayed via spraying device 844 onto the spread fibers. In some other embodiments, fiber is dip coated with mixture 858.

The impregnation process occurs under elevated temperature and pressure. Temperature is typically in a range of 100 to 400° C. depending on the melt flow and melt temperature of the polymeric binder. Pressure is typically in the range of about 500 to 2500 psi. The elevated temperature helps to ensure that mixture 858 completely wets the fiber, displacing any voids/air pockets that might otherwise exist, particularly in embodiments in which the fibers are bunched into small groups (e.g., 3-10 fibers, etc.), as opposed to being fully separated from one another.

After impregnation, the material-laden fibers are cooled via cooler 846 and then passes through former 848, which includes die 850. As the material-laden fiber pass through the die, excess binder is removed and the fibers collectively acquire the shape of the die, such that the resulting extrudate filament has a defined cross section. Extrudate filament 208 is then further processed per operation S102 of method 100, as described in conjunction with FIGS. 3 through 5.

FIG. 9 depicts an embodiment in which binder, metal, and optional additives are compounded, pelletized, and then fed to an injection molding device, wherein the pellets are melted and then applied to fiber. As depicted, binder 852 is fed to compounder 940. Metal powder 854 and any optional additives 856 are added by side feeder(s). Compounder 940 produces compounded mixture 960, which is pelletized to form pellets 964. The pellets are melted in extruder 966, producing extrudate 968. Viscosity modifiers can be added to the extruder to improve the flow characteristics of extrudate 968. The extrudate is fed to a former, wherein it coats the fibers, and the material-laden fibers are then passed through die 850, producing extrudate filament 208. The extrudate filament is then further processed per operation S102 of method 100, as described in conjunction with FIGS. 3 through 5.

FIG. 10 depicts an embodiment in which metal powder is first sprayed onto the fibers, and then binder is introduced via injection molding. As depicted, in metal powder 854 is sprayed, via spray deposition device 1072, onto fibers 204. Binder 852 is melted in extruder 966, producing extrudate 1074. Optional additives 856, such as, without limitation, viscosity modifiers, can be added to the extruder to improve the flow characteristics of extrudate 1074. The extrudate is fed to former 848, wherein the extrudate coats fibers 204, and the material-laden fibers are then passed through die 850, producing extrudate filament 208. The extrudate filament is then further processed per operation S102 of method 100, as described in conjunction with FIGS. 3 through 5.

The use of any particular extrudate filament, based on any particular type of fiber or metal, is a function of the desired physical properties of the final molded part. Such properties include, for example, tensile strength, flexural modulus, flexural strength and tensile modulus, solvent resistance, thermal resistance, density, or a combination of any of the foregoing.

Description of Materials.

Figure 7:
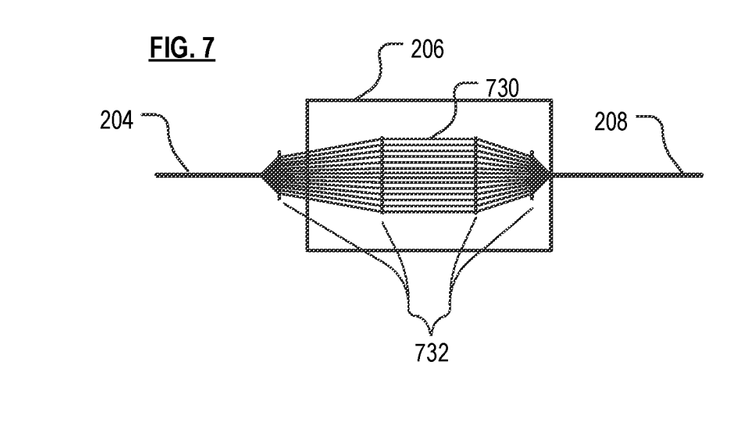
FIG. 7 depicts a schematic for performing the first operation of the method of FIG. 6.

Fiber. The fiber feed is a plurality of continuous fibers 732, typically in the form of tow(s) or bundle(s) 204. Fibers suitable for use in conjunction with embodiments of the invention will not degrade at the temperatures used to debind (typically 500° C. or higher and sinter (typically 1500° C. or higher). A fiber can be selected to impart, for example, mechanical strength to a finished part, an electrical property to the finished part, a thermal property to the finished part, and/or a higher or lower density to the finished part.

The fibers can have any diameter, which is typically but not necessarily in a range of 1 to 100 microns. The cross-sectional shape of the fiber can be circular, oval, trilobal, polygonal, etc. The fiber can have a solid core or a hollow core. The fiber can be formed of a single material, multiple materials, and can itself be a composite. The fiber can include an exterior coating such as, without limitation, sizing, to facilitate processing, adhesion of binder, minimize self-adhesion of fibers, facilitate compatibility with metal or ceramic particles, or impart certain characteristics (e.g., electrical conductivity, etc.).

When multiple spools of fiber are used, the fiber contained on the various spools can vary from one another, such as, without limitation, in the characteristics mentioned above (e.g., size, cross-sectional shape, composition, etc.).

In terms of composition, fibers 205 can be, for example, a metal, a ceramic, carbon (graphite), or combinations of any of the foregoing.

Non-limiting examples of metal fibers include steel, titanium, tungsten, aluminum, gold, silver, alloys of any of the foregoing, and shape-memory alloys.

"Ceramic" refers to ail inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing.

The fiber can itself be a composite. For example, a fiber can comprise a core that is coated with another material such as an electrically conductive material, an electrically insulating material, a thermally conductive material, or a thermally insulating material.

Binder.

An organic binder is used to facilitate wetting the fibers. It functions as a carrier of the metal particles, and so disperses the metal across the fibers and promotes the wetting, uniform distribution, and adhesion of the particles to the fiber. An organic binder can also serve to maintain the integrity of a preform and facilitate its workability.

In accordance with the present teachings, the organic binder is a thermoplastic. The thermoplastic preferably has sufficiently high glass transition temperature to facilitate handling, a sufficiently low glass transition temperature to facilitate forming a preform, and a sufficiently low pyrolysis temperature to facilitate removal of the binder from the fiber.

Non-limiting examples of suitable thermoplastic binders include polylactic acid, ethylene vinyl acetate, polyethylene, polypropylene, polystyrene, polyethylene glycol, polymethyl methacrylate, polyoxymethylene, poly(alkylene carbonate), polyacetal, polyvinylidene chlorides, acrylonitrile butadiene styrenes, polyurethanes, polyesters, polyacrylates, and polyethers or a combination of any of the foregoing.

The organic binder can be removed by heating to a temperature that is less than the sintering temperature. This process, by which the organic binder is removed from extrudate filament or a preform before sintering, is referred to as debinding.

Depending on the binder used, debinding will occur at temperatures within a range of 100° C. to 700° C.

The binder can also be selected on the basis of its decomposition behavior; that is, it can be selected so that during debinding, any residue or outgassing from the binder does not compromise the desired properties of the part being manufactured. Alternatively, the binder can be selected for its ability to be removed via catalytic solvent methods.

Metals and Ceramics.

The metal and/or ceramic material is, at least initially, in the form of a powder. Generally, the smaller and more uniform the particle size the better. An average particle size for the powder of 10 microns or less, as determined according to ASTM E2651-13, is preferable.

Metal powders suitable for use in conjunction with embodiments of the invention include those composed of pure metals or metal alloys. Non-limiting examples of suitable metals and metal alloys include iron, steel, copper/iron, copper/steel, nickel iron, nickel steel, Invar, copper-infiltrated iron, copper-infiltrated steel, copper-infiltrated carbon steel, copper-infiltrated alloy steel, stainless steel, yellow brass, nickel silver, bronze, copper, silicon iron, phosphorous iron, iron nickel, low alloy steel, soft magnetic steel, tungsten carbide, tungsten heavy alloy, aluminum cobalt chromium, titanium, or a combination of any of the foregoing.

Non-limiting examples of suitable ceramic materials include alumina, aluminum nitride, barium titanate ($BaTiO_3$), boron carbide, carbon/graphite, ferrites (e.g., manganese-zinc ferrite, nickel-zinc ferrite, etc.), garnet, lead zirconate titanate ($Pb(Zr,Ti)O_3$), lanthanum-modified lead zirconate titanate (($Pb,La)(Zr,T)O_3$), magnesium oxide, porcelain, quartz, silicates, silicon, silicon carbide, silicon dioxide gel, silicon nitride, titanate, titanium diboride, tungsten carbide, yttria, zinc oxide, zirconium, yttrium aluminum spinel, and a combination of any of the foregoing.

Optional Additives.

In some embodiments, one or more optional additives are added to the binder and metal. Such additives include, without limitation, rheological agents, surfactants, solvents, flow-control agents, surface-energy-lowering materials, and fillers.

In some embodiments, a rheological agent is added to adjust, as desired, the viscosity of the binder/metal mixture, such as to facilitate dispersing the metal particles onto the fibers, wetting the fiber, etc. Non-limiting examples of suitable rheological agents include inorganic materials such as clays and silica, and organic materials such as cellulosic materials, polyamides, acrylics, and other polymeric materials.

In some embodiments, a surfactant is added to improve the ability of the binder/metal mixture to disperse the metal particles, wetting the metal particles, and/or wet the fiber. Examples of suitable surfactants include glycerides, esters, long-chain carboxylic acids, sulfonates, and sulfates.

In some embodiments, particularly when the one or more of the materials are to sprayed onto the fibers, solvent is used. Non-limiting examples of suitable solvents include methyl ethyl ketone, and propylene glycol monomethyl ether acetate.

In some embodiments, the binder/metal mixture contains an additive for lowering surface energy to facilitate wetting of the fiber. A non-limiting example of such an additive includes silica nanoparticles.

In some embodiments, the binder/metal mixture contains one or more fillers. The filler is embedded within the metal or ceramic matrix and, as with the continuous fiber, does not become part of the metal or ceramic matrix. In other words, suitable fillers do not decompose or sinter at the temperatures used to sinter the metal or ceramic particles.

A filler can be solid or can be hollow. A filler can comprise a single material or, for example, can comprise a core having a coating of a different material. A filler can be in any suitable form such as chopped fiber, spherical particles, flakes, and/or nanoparticles. Furthermore, a filler can comprise chopped segments of a composite preform.

A filler can comprise the same material as the fiber feed or can comprise a different material. For example, the fiber feed can be silica and the filler can be silica. As a second example, the fiber feed can be carbon fiber and the filler can be chopped carbon fiber. As a third example, the continuous fiber can be carbon fiber and the filler can be silica.

Examples of suitable fillers include metals, metal alloys, ceramics, inorganic materials, and combinations of any of the foregoing.

Non-limiting examples of suitable metal and metal alloy fillers include steel titanium, aluminum, gold, silver, and alloys of any of the foregoing. Non-limiting examples of suitable inorganic fillers include carbon, alumina, basalt, calcium silicate, and rock wool. Non-limiting examples of suitable ceramic fillers include aluminum silicate, high alumina silicate, $Cr_2O_3$, $ZrO_2$ and $B_2O_3$; polycrystalline alumina, and polycrystalline mullite.

In embodiments in which the binder/metal mixture does not include any additives, the mixture includes from 70 to 99 weight percent of metal particles and/or ceramic particles, and 1 to 30 weight percent of binder, wherein weight percent is based on the total weight of the composition.

In embodiments in which rheological agents, wetting agents, and/or solvents are present in the binder/metal mixture, the total amount of each of such additives can be present in an amount from 0.1 to 5 weight percent, wherein weight percent is based on the total weight of the composition.

In embodiments in which one or more fillers are present in the mixture, the total amount of fillers can be present in an amount from 1 to 30 weight percent, wherein weight percent is based on the total weight of the composition.

EXAMPLES

Example 1

The fiber feed is carbon fiber (Toray T800S 24K tow). Thermoplastic polyurethane sizing coats the fibers, which facilitates adhesion and wetting. The metal powder is 17-4 SS (stainless steel), 16-micron diameter at D90 spread. The binder is high flow polylactic acid (PLA).

The binder and metal powder are melt blended at a temperature of 200 C. The melt blended compound (binder/metal powder) is extruded and chopped into pellets. This compound is then fed into the die with the carbon fibers under a pressure of 800 psi and a temperature of 200° C. The resulting extrudate filament is then cooled to 120° C., at which temperature it remains malleable since this is above the glass transition temperature (60° C.) of the binder. The extrudate filament is bent, creating a preform, which is then cooled to room temperature.

A plurality of preforms that are fabricated in this fashion are placed in a mold and compressed at 1000 psi under 200° C., creating a green body. The green body is debound by heating at 350° C., thereby creating a brown body. The brown body is then sintered under hydrogen gas in an oven at 1350° C. over a period of 14 hours to create the final part, a fiber-reinforced metal-matrix composite consisting only of carbon fiber in a stainless steel matrix.

Example 2

The fiber feed is glass fiber (E-glass). Thermoplastic polyether sizing coats the fibers. The ceramic powder is zirconium oxide having an average particle diameter of 10 microns. The binder is poly(alkylene carbonate).

The ceramic powder is sprayed into a melted bath of binder at a temperature of 150° C. The fibers are pulled through the melted bath and impregnated with the binder and powder. The resulting extrudate filament is then cooled to 100° C. before entering a bender/cutter where it is converted into a preform. The preforms are then automatically loaded into a mold using pick-and-place robotic arms equipped with a vision system.

The preforms are then compressed and heated in a mold, first at 200° C. for 60 minutes to burn off the resin, transitioning from a green body to a brown body. While still in the mold, the temperature is then increased to 1600° C. over a period of 6 hours. Temperature is maintained at 1600° C. for 4 hours to permit full sintering and removal of voids/porosity. The resulting fiber-reinforced ceramic-matrix composite part is then cooled over a period of 8 hours to room temperature. This gradual cool down period avoids thermal contraction or cracking. The final part consists only of ceramic material with embedded glass fiber.

It is to be understood that the disclosure describes a few embodiments and that many variations of the invention can easily be devised by those skilled in the art after reading this disclosure and that the scope of the present invention is to be determined by the following claims.

What is claimed:

1. A method comprising:
forming an extrudate filament by:
(a) tensioning and spreading apart a plurality of fibers;
(b) melting a thermoplastic binder, wherein the thermoplastic binder has a glass transition temperature and melt temperature to facilitate forming a bent preform that maintains shape at room temperature,;
(c) applying at least one of metal powder and ceramic powder, and the melted thermoplastic binder, to the plurality of fibers,
wherein the metal/ceramic powder includes at least one of metallic and ceramic spherical particles between five and fifty microns in diameter;
(d) cooling to a temperature belowthe melt temperature,
wherein subsequent to forming the extrudate filament, the extrudate filament is bent by a bender while heated past heat deflection and then cooled and put through a pulling mechanism and cutter to produce the bent preform.

2. The method of claim 1 wherein the powder is applied to the fibers before the thermoplastic binder.

3. The method of claim 1 wherein the powder is applied to the fibers at the same time as the thermoplastic binder.

4. The method of claim 1 wherein the powder and thermoplastic binder are melt-blended together.

5. The method of claim 4 wherein the melt-blended powder and thermoplastic binder are sprayed onto the fibers.

6. The method of claim 4 wherein the fibers are dip coated in the melt-blended powder and thermoplastic binder.

7. The method of claim 1 wherein the powder and thermoplastic binder are compounded together and pelletized to form pellets.

8. The method of claim 7 wherein the pellets are melted in an extruder forming a flowable material, and wherein the flowable material is applied to the fibers.

9. The method of claim 8 wherein the fiber and flowable material are passed through a die, thereby forming an extrudate filament having a cross section defined by the shape of the die.

10. The method of claim 1 wherein the extrudate filament is cooled to room temperature and spooled.

11. The method of claim 1 wherein cooling to a temperature belowthe melt temperature includes cooling to a temperature greater than the glass transition temperature.

12. The method of claim 11 further comprising:
forming a layup in a mold, wherein the layup includes a preform charge from the preform; and
heating the layup to a temperature that is sufficient to melt the binder but insufficient to debind the binder, thereby forming a green body.

13. The method of claim 12 further comprising heating the green body to a temperature that is sufficient to debind the binder, thereby forming a brown body.

14. The method of claim 13 further comprising heating the brown body to a temperature that is sufficient to sinter the powder, thereby forming a part consisting essentially of the plurality of fibers in a matrix of: the metal, or the ceramic, or the metal and ceramic.

15. The method of claim 1 wherein the fibers are carbon fiber.

16. The method of claim 1 wherein the powder is stainless steel particles.

17. The method of claim 1 wherein the powder is zirconium oxide particles.

18. The method of claim 1 further comprising applying, to the plurality of fibers, at least one additive selected from the group consisting of rheological agents, surfactants, solvents, flow-control agents, surface-energy-lowering materials, and fillers.

19. The method of claim 1, further comprising:
forming a layup in the mold, the mold defining the shape of a part, wherein the layup includes the preform or a plurality of the preforms
exposing the layup to heat and pressure, thereby forming a green body having the shape of the part; and
heating the green body to temperatures sufficient to debind the thermoplastic binder and sinter the particles, initially forming a brown body and ultimately sintering the particles forming a final part, wherein the thermoplastic binder is removed from the extrudate filament to form the brown body in the debinding step, and subsequently the brown body is exposed to an increased temperature, thereby forming the final part consisting essentially of the fibers in a matrix of: the metal, or the ceramic, or the metal and ceramic.

20. The method of claim 19 wherein the fibers are carbon fiber.

21. The method of claim 19 wherein the particles are stainless steel particles.

22. The method of claim 19 wherein the particles are zirconium oxide particles.

23. The method of claim 19 wherein the extrudate filament further includes at least one additive selected from the group consisting of rheological agents, surfactants, solvents, flow-control agents, surface-energy-lowering materials, and fillers.

* * * * *